United States Patent [19]

Lundahl et al.

[11] Patent Number: 4,679,386
[45] Date of Patent: Jul. 14, 1987

[54] HARVESTER FOR THE IMPACT-STRIPPING OF SEED FROM A STANDING CROP

[75] Inventors: E. Cordell Lundahl, Logan, Utah; Neil L. West, Bettendorf, Iowa; Homer D. Witzel, Englewood, Fla.

[73] Assignee: Deere & Company, Moline, Ill.

[21] Appl. No.: 375,838

[22] Filed: May 7, 1982

[51] Int. Cl.$^4$ .................. A01D 45/00; A01D 41/00
[52] U.S. Cl. .................................. 56/126; 56/14.2; 56/DIG. 12; 130/27 R
[58] Field of Search .............. 56/13.2, 13.6, 14.1, 56/14.2, 33, 126–130, 220, 221, 330, DIG. 12; 130/27 R, 30 R

[56] References Cited

U.S. PATENT DOCUMENTS

| | | | |
|---|---|---|---|
| 781,662 | 2/1905 | Kristler | 56/128 |
| 2,495,417 | 1/1950 | McConnel et al. | 56/128 |
| 2,547,749 | 4/1951 | Gray | 56/130 |
| 2,620,614 | 12/1952 | McConnel et al. | 56/128 |
| 2,734,329 | 2/1956 | Fogle | 56/33 |
| 2,749,916 | 6/1956 | McConnel | 130/27 R |
| 3,184,904 | 5/1965 | Fiedler | 56/126 |
| 3,184,905 | 5/1965 | Hillier | 56/130 |
| 3,473,304 | 10/1969 | Morgan | 56/126 |

FOREIGN PATENT DOCUMENTS

| | | | |
|---|---|---|---|
| 112078 | 12/1940 | Australia | 56/126 |
| 217670 | 1/1958 | Australia | 56/126 |

*Primary Examiner*—Paul J. Hirsch

[57] ABSTRACT

A harvester strips seeds from a standing crop while essentially leaving the stems of the crop attached to the soil. The harvester comprises a mobile main frame and a vertically adjustable harvesting header carried thereby. A first axially transverse rotor is mounted on the header with its axis generally below the level of substantially all the seeds on the standing crop. The first rotor includes a hub and outwardly projecting stripper elements. The stripper elements define longitudinally spaced openings on the rotor periphery of a width greater than upper seed-bearing heads of the crop, permitting the introduction of the seed-bearing heads into the rotor interior as the machine advances so that the seeds are impacted by sides of the stripper elements interiorly of the outer end thereof. A second axially transverse rotor is disposed parallel to, above and forwardly of the first rotor and has a generally cylindrical outer periphery adjacent the periphery of the first rotor. The axis of the second rotor is generally above the level of substantially all the seeds on the standing crop. A motor drives the rotors in opposite directions with the front side of the first rotor moving upwardly and the front side of the second rotor moving downwardly. The first rotor is driven so that the sides of the stripper elements impact the seeds disposed within the openings in the rotor in a generally stemwise direction to knock the seeds from the stems and propel them tangentially from the rotor. A crop collector is mounted on the header behind the rotors to receive the seeds propelled rearwardly from the rotors.

12 Claims, 8 Drawing Figures

HARVESTER FOR THE IMPACT-STRIPPING OF SEED FROM A STANDING CROP

BACKGROUND OF THE INVENTION

The present invention relates to the harvesting of seeds from soil crops and especially to the stripping of seeds from a standing crop while leaving the stems of the crop attached to the ground.

Some soil crops, such as wheat for example, have traditionally been harvested by combines which cut and collect the standing stalks with the head of grain attached, and thereafter separate the grain seeds from the chaff. Although effective, such combines are quite large and costly, due in large part to the high power requirements and the need for providing a separating mechanism capable of separating and handling the large amounts of chaff which are collected.

Other soil crops, such as grass seed for example, have been harvested by machines which employ one or more rotary brushes or other tined rollers which are intended to tear or pull the seeds from the stems. The removed seeds are impelled to a collecting zone, possibly with the aid of an air suction or blowing mechanism. Exemplary of such structures are the disclosures in U.S. Pat. No. 1,134,443 issued to Engle on Apr. 6, 1915; U.S. Pat. No. 1,206,409 issued to Bruce on Nov. 28, 1916; and U.S. Pat. No. 2,460,029 issued to Ramp on Jan. 25, 1949.

In an earlier proposal of E. Cordell Lundahl, disclosed in an earlier U.S. patent application Ser. No. 371741, filed Apr. 26, 1982, a harvesting machine has been described in which upper and lower rotary brushes are mounted axially transverse and define a bite within which the crop heads are engaged by the brush bristles. The ends of the bristles are randomly and closely spaced along the brush periphery in the longitudinal and circumferential directions to present a substantially "solid" face to the crop. A rear air stream is directed upwardly from behind the brushes to carry off stripped seeds. A front air stream is directed rearwardly against crop stems located ahead of the brushes to bend the stems toward the bite. The seeds are stripped from the crop heads by a rubbing action of the bristles against the crop heads, whereas the crop stems remain attached to the ground. Although such a proposal offers significant advantages over traditional harvesting techniques which involve the handling of significantly greater amounts of chaff, substantial room for improvement remains. For example, the engagement of the crop heads by the bristle tips within the bite may tend to pinch off not only the seeds, but possibly the crop heads themselves and even parts of the stem, especially since the stem does not have a convenient "escape" route through the brush. Moreover, since stripping occurs within the bite, the height adjustment of the brushes relative to the crop height is very sensitive.

It has also been heretofore proposed to apply a "beating" concept to a grain harvesting machine as described for example in U.S. Pat. Nos. 2,495,417 and 2,620,614 issued to Mc Connel et al on Jan. 24, 1950 and Dec. 9, 1952, respectively. In the machine disclosed in the Mc Conel et al patents, discs are spaced along a horizontal rotary shaft so that as the machine advances through the crop, heads of grain are able to pass between the discs. Wedge elements carried by faces of the discs impact upwardly against the grain heads as the discs rotate. The wedge elements are inclined vertically and slam the heads sideways against the face of an adjacent disc. Such slamming action is intended to knock grain seeds from the head, while leaving the stem in the ground. In order to collect the separated grain kernels, blades are mounted at outer edges of the discs (or rods) to generate a rearward air stream to entrain the kernels and direct them to a collecting zone. It has also been proposed in U.S. Pat. No. 2,749,916 issued to Mc Connell on June 12, 1956, to use bent rods of circular cross section in lieu of discs. The above-described machine has not, however, been commercially successful due in part to its inability to perform acceptably in relatively short standing crops.

Numerous other grain harvesters have been proposed which involve a rotary beater intended to strike the grain heads in some fashion to separate the grain from the stalk. Exemplary of such machines are the disclosures in the following U.S. Pat. Nos. 781,662 issued to Kistler on Feb. 7, 1905; 1,418,542 issued to Dill on June 6, 1922; 2,547,749 issued to Gray on Apr. 3, 1951; 2,627,713 issued to Manning on Feb. 10, 1953; 3,184,904 issued to Fiedler on May 25, 1965; 2,853,845 issued to Smith on Sept. 30, 1958; 3,184,905 issued to Hillier on May 25, 1965; and French Pat. No. 1,240,440 issued Nov. 17, 1959. However, none of those proposals has achieved commercial success.

SUMMARY OF THE INVENTION

It is, therefore, an object of the present invention to provide a novel seed harvester which maximizes the removal of crop seeds and minimizes the intake of chaff.

Another object of the invention is to provide such a harvester which conveys removed seeds to a collecting zone with minimal losses.

It is a further object of the invention to provide such a harvester which impacts crop heads and jars seed therefrom while leaving the crop stems attached to the ground.

It is yet another object of the invention to provide such a harvester which reduces the power requirements typical of traditional combines.

These objects are achieved by the present invention which relates to a harvesting machine for stripping seeds from a standing crop while essentially leaving the stems of the crop attached to the soil. The harvester comprises a mobile main frame adapted to advance over a field of the standing crop. A vertically adjustable harvesting header is carried by the main frame. A first axially transverse rotor is mounted on the header with its axis generally below the level of substantially all the seeds on the standing crop. The first rotor includes a hub and outwardly projecting stripper elements whose outer ends define the rotary periphery whereby the rotor generates a cylinder as it rotates. The stripper elements define longitudinally spaced openings on the rotor periphery of a width greater than upper seed-bearing heads of the crop, thereby permitting the introduction of the seed-bearing heads into the rotor interior as the machine advances so that the seeds are impacted by sides of the stripper elements interiorly of the outer ends thereof. A second axially transverse rotor is disposed parallel to, above and forwardly of the first rotor and has a generally cylindrical outer periphery adjacent the periphery of the first rotor. The axis of the second rotor is generally above the level of substantially all the seeds on the standing crop. A drive mechanism drives the rotors in opposite directions with the front side of the first rotor moving upwardly and the front side of the second rotor moving downwardly. The first rotor is driven so that the sides of the stripper elements impact the seeds disposed within the openings in the rotor in a generally stem-wise direction to knock the seeds from the stems and propel them tangentially from the rotor. A crop collector is mounted on the header behind the rotors and is adapted to receive the seeds propelled rearwardly from the rotors.

Preferably, the stripper elements comprise brush bristles which are helically aligned on the rotor to define the crop-receiving openings between adjacent revolutions of the helix. Alternatively, the bristles may form wafer-like members which are disposed at alternating positive and negative angles on the rotor axis so that divergent sides of adjacent wafer members form the crop-receiving openings.

The rotors are preferably driven at speeds whereby the peripheral tip speed of the rotors lies between 18 and 27 m/sec. This results in a favorable impact-stripping of seeds and collection of stripped seeds.

These objects and advantages of the invention will become apparent from the following detailed description of preferred embodiments thereof in connection with the accompanying drawings in which like numerals designate like elements.

DESCRIPTION OF THE PREFERRED EMBODIMENT

Figure 1:
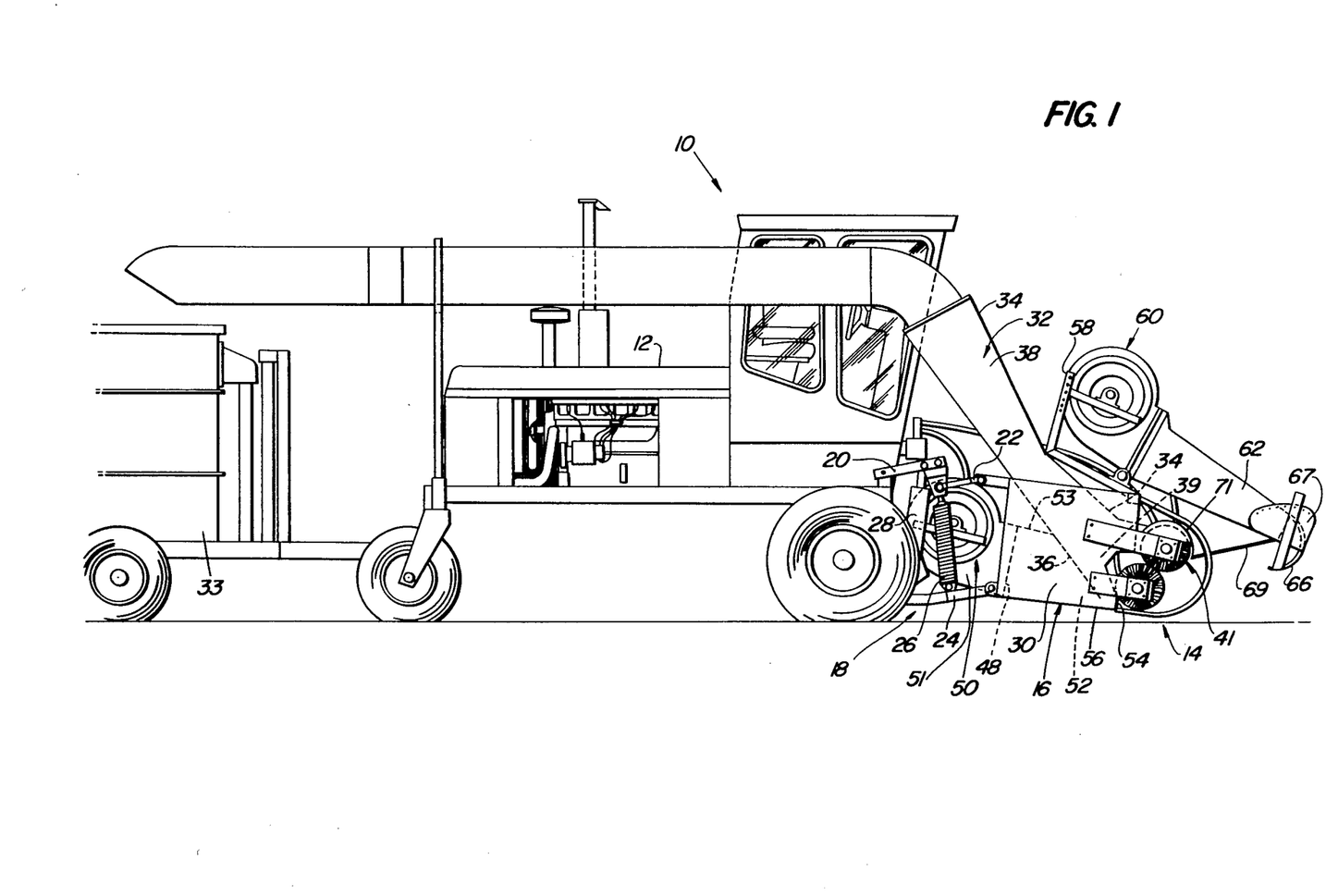
FIG. 1 is a side elevational view of a harvester according to the present invention.
Figure 2:
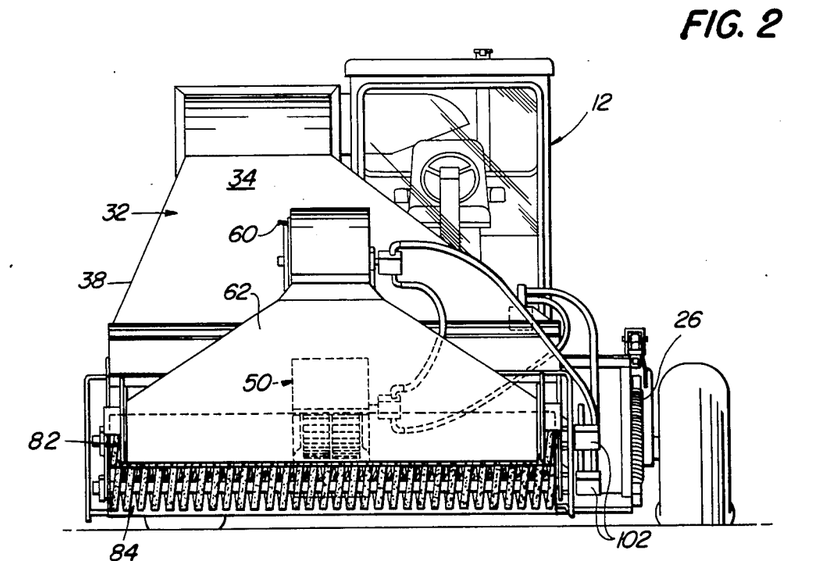
FIG. 2 is a front view of the harvester.

A harvester 10 according to the present invention comprises a self-propelled vehicle 12 to the front of which is mounted a vertically adjustable header 14 including a housing 16. The header 14 is connected to the vehicle by means of a suitable hitch 18. The hitch can be of conventional design, including one or more upper links 20, the front ends of which being pivotably connected to the rear ends of arms 22. The front ends of the arms 22 are connected to the housing 16. The hitch also includes a plurality of lower links 24 each pivotably connected to the vehicle 12 and to the housing 16. The upper and lower links 20, 24 are interconnected by float springs 26.

The header 14 is raised and lowered by hydraulic cylinders 28 which are pivotably connected between the vehicle 12 and the upper hitch links 20. The cylinders 28 are actuated by the vehicle hydraulic system.

The header housing 16 comprises a pair of side plates 30 joined at the rear by a transverse end plate (not shown) to which the arms 24 are connected. Mounted to the header housing 16 is a transport duct 32 for collecting and conducting away seeds which are separated from the crop stems. The duct 32 empties into a mobile collecting bin 33 towed behind the vehicle 12. The duct 32 includes top and bottom walls 34, 36 and sidewalls 38. The sidewalls 38 are mounted flush against the side plates 30 of the header housing 16. The mouth 39 or inlet end of the duct 32 extends between the plates 30 of the header immediately behind a crop stripping mechanism 41 carried at the front of the header as will be described in detail hereinafter.

Mounted on the rear of the header housing 16 is a first air blower 50 for generating a positive pressure air stream. The blower 50 can be of any suitable type and is enclosed by a housing 51 which defines an air outlet 48 arranged to impel air forwardly into a conduit 52 and thence into the mouth of the transport duct 32 creating a low pressure area behind the stripping mechanism. The conduit 52 is defined by the side plates 30 of the header, a top plate 53 extending from the conduit 32, an upright front plate 54, a bottom plate 56 extending between the side plates 30, and the bottom wall 36 of the transport duct 32. The front plate 54 forms an upright air deflector wall 54 which reverses the air flow. The mouth of the duct 32 terminates short of the bottom plate 56 and the front plate or deflector wall 54 to define a gap 55 through which the air stream flows. As will be explained hereafter, the air stream receives and entrains harvested seeds from the stripper mechanism 41 and transports the seeds to the collecting bin 33.

Mounted on a framework 58 atop an upper end of the header housing 16 is a second air blower mechanism 60 which is arranged to generate an air stream which travels rearwardly in the general direction of the stripper mechanism. The blower 60 communicates with a conduit 62 that has a curved baffle 66 at its forward end to reverse the air flow. The baffle 66 is carried by a pivoted adjustment flange 67 which can be adjustably moved upon the conduit 62 to enable the inclination of the baffle plate 66 to be varied. As will be described hereinafter, the air stream from the conduit 62 is directed rearwardly and downwardly against a standing crop in front of the stripper mechanism to bend the crop stems ST rearwardly in order to reorient the heads H of the crop C in a more advantegeous posture for contact by the stripper mechanism. This air stream is concentrated in a direction toward the crop by means of a guide surface 69 extending from the baffle 66 to a hood 71 which surrounds an upper portion of the stripper mechanism.

Figure 3:
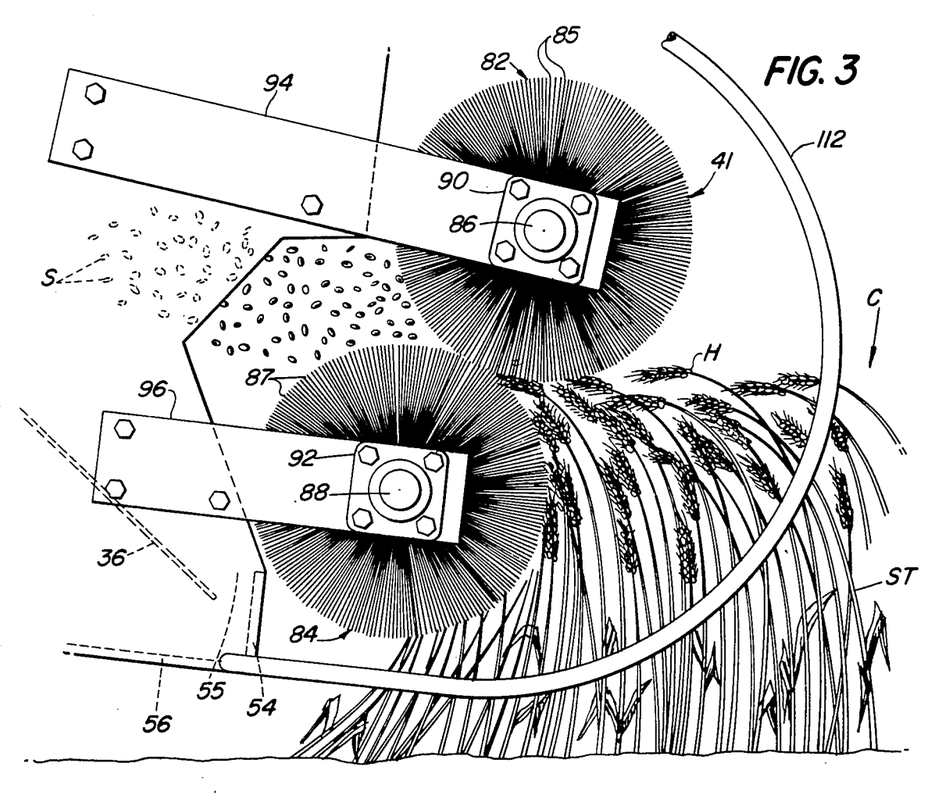
FIG. 3 is a fragmentary side view of a seed stripper mechanism of the harvester passsing through a standing crop.

The stripper mechanism 41 includes upper and lower rotors 82, 84 which are mounted for rotation about longitudinal axes disposed transversely of the direction of travel of the header. The rotors include crop contacting elements which strip seeds from the crop.

Preferably, the rotors are each in the form of a rotary brush which comprises a central hub from which project radial bristles 85, 87 formed of a stiff plastic such as polyurethane. Although the bristles may be of any suitable shape, they are preferably of the type having an elliptical cross section and are crimped.

The brushes are mounted on horizontal shafts 86, 88 which are rotatably carried in bearings 90, 92 on opposite sides of the header 16. Upper bearings 90 for the upper brush 82 are carried at the forward ends of adjustable upper arms 94 and the lower bearings 92 for the lower brush 94 are carried by adjustable lower arms 96. By means of the arms 94, 96 the brushes 82, 84 can be independently raised and lowered to adapt the mechanism to crops of different height. The brushes can be of any suitable diameter, preferably six to eight inches in diameter.

The bristles of the upper brush are of a common radial length with the outer ends thereof randomly arranged and closely spaced on the brush periphery so that the brush presents a substantially solid face to the crop heads in longitudinal and circumferential directions of the brush (e.g., the bristle ends may be spaced one-half to one and one-half inches).

Figure 4:
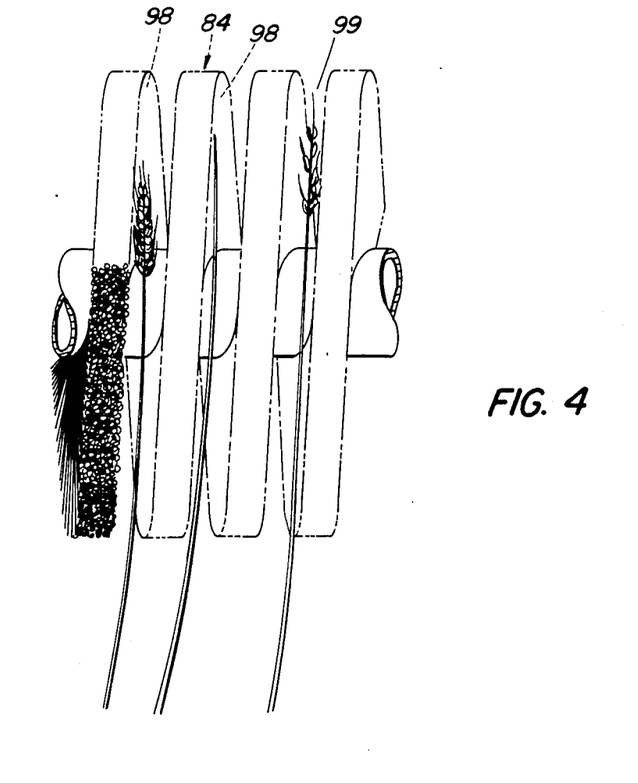
FIG. 4 is a front view of a lower helical rotor of the stripper mechanism depicting the manner in which crop heads are impacted by interior walls of the rotor.

The lower brush has longitudinally spaced groups of bristles whose sides are arranged to form wall-like sections which are spaced longitudinally along the brush axis and which are inclined at acute angles relative thereto. In one preferred embodiment, the group of bristles are closely spaced and helically aligned upon the hub such that a continuous helical wall 98 is formed by adjacent bristles. Accordingly, as viewed by a crop head approached by the machine, the wall 98 travels transversely relative to the direction of vehicle travel as the lower brush rotates. Thus, after the crop enters an opening 99 defined between adjacent revolutions of the helical wall 98, the rotating wall approaches the crop head from the side and impacts upwardly thereagainst due to the upward direction of travel of that portion of the brush 84 (FIG. 4). The crop head is thus subjected to a sudden, intense impact at one side and in a stem-wise direction which tends to "explode" the seeds from the head. The seeds knocked loose from the crop head in this fashion are impelled upwardly and rearwardly. As the harvester continues to advance, the crop stem passes through the helical opening 99 and exits the machine still attached to the ground. It will be appreciated that the opening 99 is wider than the crop head to prevent the crop head from being pinched off at the brush periphery.

Crop heads situated higher than the lower brush are contacted by the bristles of the "solid" upper brush and the seeds are stripped thereby from such crop heads. To optimize the stripping efficiency, the lower side of the lower brush, and most preferably the axis of that brush, is disposed below the level of seeds on the standing crop, and the axis of the upper brush is above the level of the seeds on the crop. Moreover, the bristles 85 of the upper brush 82 extend forwardly of the lower bristles 87. Thus, the upper bristles make contact with taller crop heads which are in an inclined posture due to the air stream from the upper blower 60. Those crop heads are thus maintained in such inclined posture by the upper brush or even further inclined thereby.

The air flow from the upper blower 60 is assisted by an air suction induced by the travel of air from the lower blower 50 and by the high-speed rotation of the brushes themselves. Thus, the standing crop is acted upon by rearward air flow from the upper blower 60 on the one hand, and by suction developed by the air stream from the lower blower 50 and the brushes, on the other hand.

In one preferred embodiment of the invention, the top blower 60 generates an air stream of about 2.17 $m^3$/sec, which produces an air stream velocity of approximately 44 m/sec at the blower outlet and approximately 20 m/sec at the front of the brushes. The lower blower 50 generates an air stream of about 2.05 $m^3$/sec which flows through the gap 55 at a velocity of approximately 30 m/sec.

The stripped seeds are propelled rearwardly by the brushes 82, 84 and become entrained within the discharge flow formed by a combination of the above-described air generating mechanisms.

The rear side of the lower brush 84 is situated such that the air stream from the lower blower 50 passes upwardly along the bristles thereof to impel toward the duct 32 any seeds which may have strayed from the discharge air flow.

Importantly, it has been found that the brushes should be driven such that the peripheral speed thereof, i.e., the linear speed of the bristle tips, is in the range of from 18 to 27 meters per second (m/sec), and most preferably from 21 to 23 m/sec, in order to achieve the most effective impact-stripping and collection of the seeds. That is, at higher speeds, the seeds tend to be thrown in random directions and an excessive amount of seed loss occurs. At lower speeds, the impact intensity is too small, resulting in an excessive quantity of seeds left on the stem.

The brushes are respectively driven by a pair of individual motors 102 mounted to one side of the header 14 and preferably powered by the hydraulic system on the drive vehicle 12. The motors are connected in series in the preferred embodiment, with the leakage from the first or upper motor returned to the hydraulic system reservoir, so that the top brush is driven at a slightly greater speed than the lower.

Figure 5:
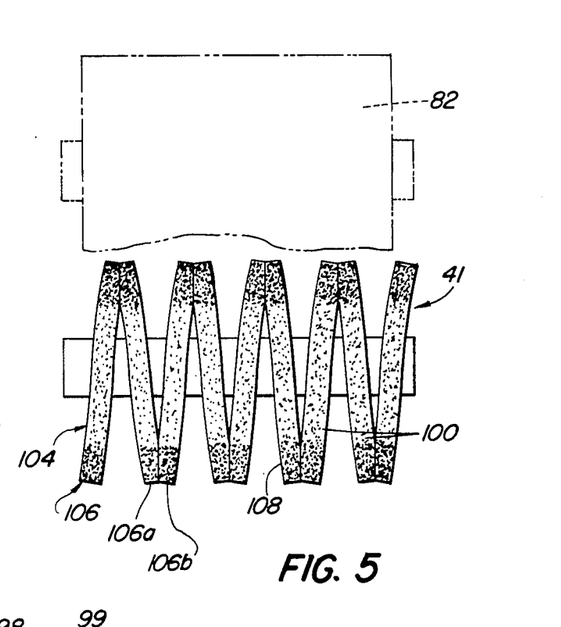
FIG. 5 is a schematic front view of an alternative embodiment of the lower rotor which employs convergent wafers.
Figure 6:
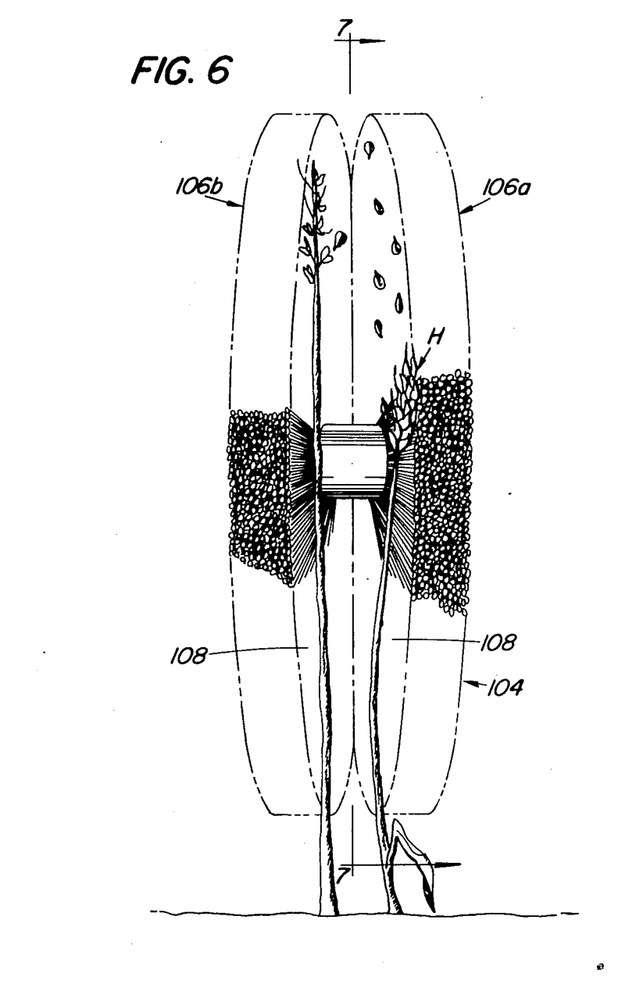
FIG. 6 is an englarged schematic view depicting, from the front, the manner in which the convergent wafers of FIG. 5 impact against the crop heads.
Figure 7:
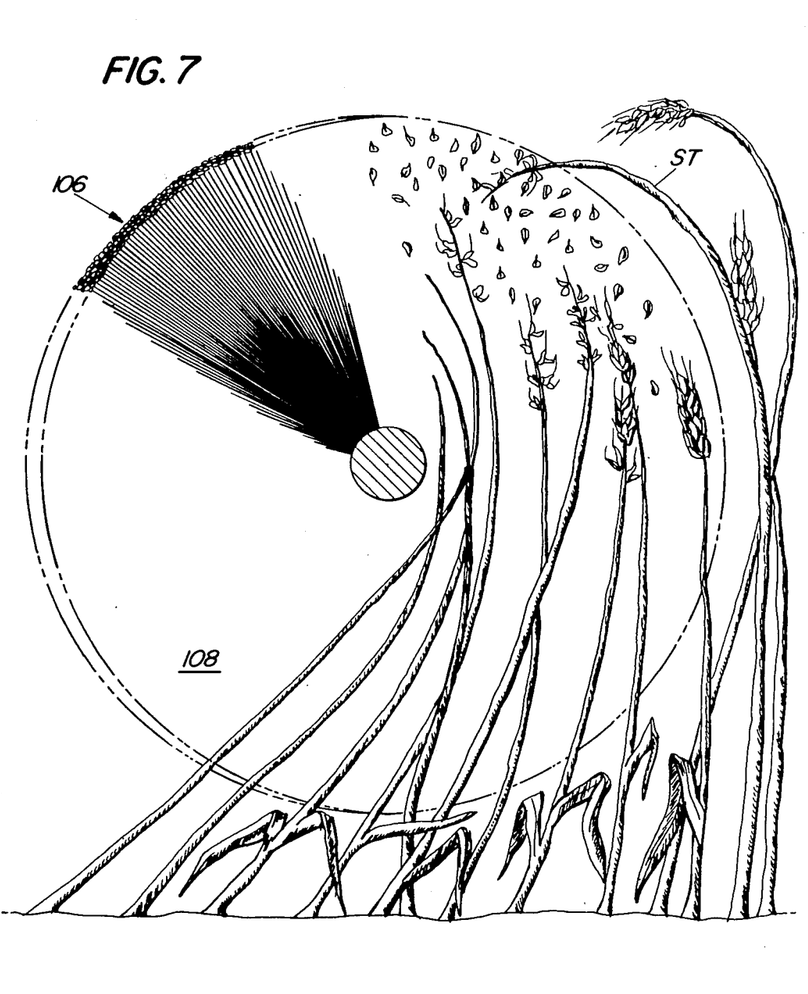
FIG. 7 is a section viewed along the line 7—7 of FIG. 6.

Another preferred embodiment of the lower rotor is depicted in FIGS. 5-7. That rotor 104 comprises a plurality of disc or wafer-type brushes 106 formed by bristles similar to those 85, 87 discussed earlier. The brushes are oriented at alternating positive and negative acute angles relative to the rotary axis. Thus, the adjacent wafers 106A, B converge on one side of the shaft and diverge at the opposite side to form longitudinally spaced openings. The wafer brushes may be arranged to contact at their points of convergence or may be spaced from one another at such points. Both sides 108 of each wafer brush formed by adjacent radial bristles define continuous abutment "walls" around the rotary axis which function in a manner similar to the helical wall of the afore-described spiral brush 84. That is, rotation of the brush produces, in effect lateral movement of each wall 108 relative to the associated crop heads. Accordingly, the wall impacts upwardly against the side of the crop heads, to produce seed-jaring force in a stem-wise direction similar to that described in relation to the afore-described helical wall 98. The diverging portions 100 of the wafer brushes are spaced by a distance greater than the width of the crop head to enable the remaining head and stem of the stripped crop to exit the brush.

In practice it has been found that the convergent wafer brush 104 functions more effectively in very short crops than the helical brush 84, whereas the latter functions better in taller crop than the convergent wafer brush.

In lieu of a "solid" upper brush 82, it may be desirable to employ a helical brush 110 (FIG. 8) which is arranged to cooperate with the lower helical brush 84. In this fashion, the upper brush 110 would strip seeds by the impact action described earlier in connection with the lower brush 84 except that the seeds would be knocked downwardly and rearwardly. It would be necessary to adjust the axis of the upper brush 110 to assure that the crop heads are located below the axis of the upper brush to achieve the proper direction of travel for the stripped seeds.

The header 16 is preferably provided with dividers 112 which separate the standing crop in advance of the stripping mechanism.

In practice, the harvesting machine is advanced over a field of standing crop C such as wheat or grass seed for example, although other crops as well may be subject to harvesting by the present invention.

As the crop heads H approach the brushes 82, taller stems ST are bent rearwardly under the action of (1) the rearwardly and downwardly directed air stream from the upper blower 60, (2) a rearward suction induced by the air stream from the lower blower 50 passing behind the brushes, and (3) the rearward air flow generated by the bristles themselves. Most of the crop heads are acted upon by the lower brush 84 as the crop heads enter the interior of the brush via the openings 99 formed by the helically aligned bristles. Since the wall 98 shifts transversely relative to the direction of machine advance and relative to the crop head, the wall 98 approaches and impacts in a stem-wise direction against the crop head, causing the seeds to explode upwardly from the crop head. The seeds travel rearwardly into the air discharge flow or may be deflected into such discharge flow by the upper brush 82. The stem remains attached to the ground and "exits" the brush 84 rearwardly through the opening 99.

Figure 8:
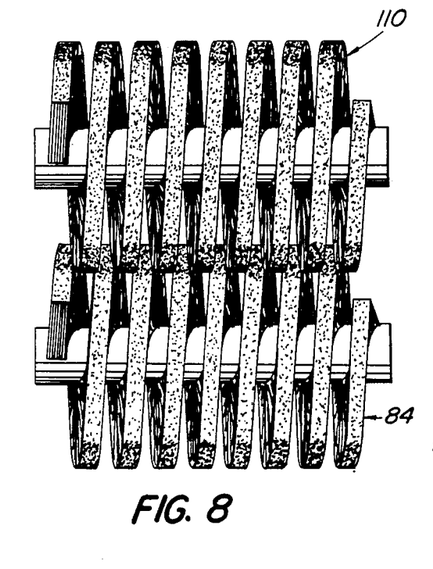
FIG. 8 is a schematic front view of an alternative stripper mechanism employing a helical-type upper rotor.

If a convergent wafer-type of brush 104 is employed, a similar action occurs as the sides 108 of the wafers strike against the grain heads. Similarly, the helical upper brush 110, if employed, impacts downwardly against the taller crop heads and explodes the seeds downwardly and rearwardly into the discharge air stream.

With the brush speed maintained at from 18 to 27 m/sec, and most preferably from 21 to 23 m/sec, it is assured that the crop heads will be impacted with sufficient force to explode essentially all of the seeds from the head, with essentially all of those seeds being directed toward the discharge air stream.

Seeds which may have strayed from or missed the discharge air flow and which are traveling downwardly behind or within the lower brush 84 are acted upon by the air stream from the lower blower 50 and are carried back into the discharge air flow.

The collected seeds are conducted by the duct 32 and are discharged into the mobile bin 33.

It will be appreciated that the present invention provides a novel and effective seed harvester which is smaller and less expensive than a traditional combine, mainly due to the reduced amount of chaff and straw which is carried in. By employing an impact-stripper mechanism which essentially leaves the stems attached to the ground, smaller and less complicated material-handling equipment is required. Also, power requirements are significantly reduced. An important aspect of the present invention relates to the provision of a rotor mechanism which impacts against the side of a crop head in a primarily stem-wise direction to knock the seeds from the head which enables those seeds to be collected. Each rotor functions in a seed-stripping capacity and in a seed-deflecting capacity (relative to seeds stripped by the other rotor) to promote collection of the stripped seeds. Also of particular significance is the use of a range of rotor speeds which achieves successful impact-stripping and yet leaves the crop stems attached to the ground.

Although the invention has been described in connection with preferred embodiments thereof, it will be appreciated by those skilled in the art, that additions, modifications, substitutions, and deletions not specifically described may be made without departing from the spirit and scope of the invention as defined in the appended claims.

We claim:

1. A harvesting machine for stripping seeds from seed-bearing heads n a standing crop while essentially leaving the stems of the crop attached to the soil and comprising:

a mobile main frame adapted to advance over a field of the standing crop;

a vertically adjustable harvesting header carried by the main frame;

a first axially transverse rotor mounted on the header with its axis generally below the level of substantially all the seed-bearing heads on the standing crop and including a hub and outwardly projecting stripper means whose outer ends define the rotor periphery whereby the rotor generates a cylinder as it rotates, the stripper means defining longitudinally spaced openings on the rotor periphery of a width ggreater than upper seed-bearing heads into the rotor interior as the machine advances so that the heads are impacted of angulated sides of the stripper means interiorly of the outer end thereof;

a second axialy transverse rotor disposed parallel to, above and forwardly of the first rotor anbd having a generally cylindrical outer periphery adjacent the periphery of the first rotor, the axis of the second rotor being generally above the level of substantially all the seed-bearing heads on the standing crop;

means for driving the rotor in opposite directions at perpheral speeds greater than 18 m/sec with the front side of the first rotor moving upwardly and the front side of the second rotor moving downwardly, the first rotor being driven so that the angulated sides of the stripper means impact the seed-bearing heads disposed within the openings in the rotor in a generally stem-wise direction to knock the seeds from the heads and to propel them rearwardly from the rotor; and crop collection means mounted on the header behind the rotors and adapted to receive the seeds propelled rearwardly from the rotors.

2. The invention defined in claim 1, wherein the sides of the stripper means comprise a continuous wall means around the axis of the first rotor, which wall means forms an acute angle with the axis of the first rotor and defines the openings and imports against the crop.

3. The invention defined in claim 1, wherein the stripper means comprises brush bristles that are mounted in axially spaced groups having side boundaries that extend in a non-circumferential and non-axial direction to form the openings, the sides of the bristles on the boundaries of the openings engaging the seed disposed within the rotor.

4. The invention defined in claim 3, wherein the bristles on the first rotor are arranged in a spiral pattern, the bristles in one revolution of the spiral being axially spaced from the adjacent revolution to form the openings.

5. The invention defined in claim 1, wherein the stripper means comprises a plurality of wafer-like members disposed at alternating positive and negative acute angles along the axis of the first rotor.

6. The invention as defined in claim 5, wherein the wafer-like members each comprise a group of outwardly projecting bristles.

7. The invention as defined in claim 1, wherein the second rotor includes openings into which taller seed-bearing crop heads are received.

8. A harvesting machine for stripping seeds from seed-bearing heads on a standing crop while essentially leaving the stems of the crop attached to the soil and comprising:

a mobile main frame adapted to advance over a field of the standing crop;

a vertically adjustable harvesting header carried by the main frame;

a first axially transverse rotor mounted on the header with its axis generally below the level of substantially all the heads on the standing crop and including a hub and a plurality of outwardly projecting stripping elements having their outer ends at the rotor periphery so that the rotor generates a cylinder as it rotates, the stripping elements being spaced and arranged in a regular pattern to present laterally spaced openings on the rotor periphery wider than the seed-bearing heads of the crop, permitting the introduction of the seed-bearing heads into the rotor interior as the machine advances so that the seeds are impacted by non-circumferential sides of the stripping elements interiorly of the outer ends thereof;

a second rotor disposed parallel to, above and forwardly of the first rotor and having a generally cylindrical outer periphery adjacent the periphery of the first rotor, the axis of the second rotor being generally above the level of substantially all the seed-bearing heads on the standing crop;

means for driving the rotors in opposite directions with the front side of the first rotor moving upwardly and the front side of the second rotor moving downwardly, the first rotor being driven so that its peripheral speed is in the range of 18-27 m/sec, whereby the sides of the radial stripping elements impact the seed-bearing heads disposed within the openings in the rotor in a generally stem-wise direction to knock the seeds from the heads and propel them rearwardly from the rotor; and crop collection means mounted on the header behind the rotors and adapted to receive the seeds propelled rearwardly from the rotors.

9. The invention defined in claim 8, wherein the sides of the stripper elements define a continuous wall around the rotor axis which forms the openings and impacts against the crop.

10. The invention defined in claim 8, wherein the stripper elements on the first rotor comprise brush bristles that are mounted in axially spaced groups having side boundaries that extend in a non-circumferential direction to form the openings, the side of the bristles on the boundaries of the openings engaging the seeds disposed within the rotor.

11. The invention defined in claim 10, wherein the bristles on the first rotor are arranged in a spiral pattern, the bristles in one revolution of the spiral being axially spaced from the adjacent revolution to form the openings.

12. The invention defined in claim 10, wherein the bristles are arranged to form wafer-like members disposed at alternating positive and negative acute angles along the rotor axis.

* * * * *

UNITED STATES PATENT AND TRADEMARK OFFICE
CERTIFICATE OF CORRECTION

PATENT NO. : 4,679,386

DATED : 14 July 1987

INVENTOR(S) : E. Cordell Lundahl, Neil L. West and Homer D. Witzel

It is certified that error appears in the above-identified patent and that said Letters Patent is hereby corrected as shown below:

Column 8, line 12, "n" should be --in--.
         line 27, "ggreater" should be --greater--; after "heads" insert --of the crop, permitting the introduction of the seed-bearing heads--.
         line 29, "of" (first occurrence) should be --by--
         line 31, "axialy" should be --axially--.
         line 32, "anbd" should be --and--.
         line 38, "rotor" should be --rotors--.
         line 39, "perpheral" should be --peripheral--.
         line 55, "imports" should be --impacts--.

Signed and Sealed this

Twenty-fourth Day of May, 1988

Attest:

DONALD J. QUIGG

Attesting Officer

Commissioner of Patents and Trademarks